United States Patent
Kikumoto et al.

(10) Patent No.: US 8,804,155 B2
(45) Date of Patent: Aug. 12, 2014

(54) PRINT JOB INFORMATION MANAGING DEVICE, PRINT JOB INFORMATION MANAGING METHOD, AND RECORDING MEDIUM

(75) Inventors: Takashi Kikumoto, Kanagawa (JP); Masahiko Yajima, Kanagawa (JP); Hirokazu Tanaka, Kanagawa (JP); Katsuhito Habaguchi, Kanagawa (JP); Bo Liu, Kanagawa (JP); Masayuki Iwasawa, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 226 days.

(21) Appl. No.: 12/862,905

(22) Filed: Aug. 25, 2010

(65) Prior Publication Data

US 2011/0228309 A1 Sep. 22, 2011

(30) Foreign Application Priority Data

Mar. 19, 2010 (JP) ................................. 2010-064630

(51) Int. Cl.
*G06K 15/00* (2006.01)
(52) U.S. Cl.
USPC ......................................... 358/1.14; 358/1.15
(58) Field of Classification Search
CPC ... G06F 21/608; G06F 3/1207; G06F 3/1222; G06F 3/1238; G06K 15/4095
USPC .................... 358/1.1–1.9, 515, 521
IPC ....................................................... G06K 15/00
See application file for complete search history.

(56) References Cited

U.S. PATENT DOCUMENTS

| | | | |
|---|---|---|---|
| 5,287,194 A * | 2/1994 | Lobiondo | 358/296 |
| 5,410,646 A | 4/1995 | Tondevold et al. | |
| 5,633,932 A * | 5/1997 | Davis et al. | 713/176 |
| 6,667,810 B1 * | 12/2003 | Jeyachandran et al. | 358/1.14 |
| 6,862,583 B1 * | 3/2005 | Mazzagatte et al. | 705/64 |
| 7,130,066 B1 * | 10/2006 | Kanematu | 358/1.15 |
| 8,127,365 B1 * | 2/2012 | Liu et al. | 726/26 |
| 2004/0213612 A1 | 10/2004 | Hanaoka | |
| 2005/0262572 A1 * | 11/2005 | Yoneyama | 726/27 |
| 2006/0256364 A1 * | 11/2006 | Yamamoto | 358/1.14 |
| 2007/0064269 A1 * | 3/2007 | Mokuya et al. | 358/1.15 |
| 2007/0211279 A1 * | 9/2007 | Podl et al. | 358/1.15 |
| 2008/0062461 A1 * | 3/2008 | Shiono et al. | 358/1.15 |

(Continued)

FOREIGN PATENT DOCUMENTS

| | | |
|---|---|---|
| CN | 1154291 | 6/2004 |
| JP | H05-303531 | 11/1993 |

(Continued)

OTHER PUBLICATIONS

Office Action in JP 2010-064630 and English translation.

(Continued)

*Primary Examiner* — King Poon
*Assistant Examiner* — Ibrahim Siddo
(74) *Attorney, Agent, or Firm* — Fildes & Outland, P.C.

(57) ABSTRACT

A print job information managing device of the present invention has: an authentication request instruction adding section that adds, to a print job, an authentication request instruction that expresses whether or not authentication is needed at a time of printing; a transmitting section that transmits the print job to a printer; and a notification section that, when the authentication request instruction has been added to the print job transmitted by the transmitting section, notifies a printing recipient that the print job has been transmitted.

17 Claims, 16 Drawing Sheets

(56) References Cited

U.S. PATENT DOCUMENTS

| | | | |
|---|---|---|---|
| 2008/0100863 A1* | 5/2008 | Funahashi | 358/1.15 |
| 2008/0195648 A1* | 8/2008 | Matsumoto | 707/102 |
| 2009/0244595 A1* | 10/2009 | Kim et al. | 358/1.15 |
| 2010/0302575 A1* | 12/2010 | Hanaoka et al. | 358/1.15 |

FOREIGN PATENT DOCUMENTS

| | | |
|---|---|---|
| JP | 2003-271356 | 9/2003 |
| JP | 2006-159460 | 6/2006 |
| JP | 2007-034615 | 2/2007 |
| JP | 2008-077438 | 4/2008 |
| JP | 2008-80652 | 4/2008 |

OTHER PUBLICATIONS

Machine translation of JP 2007-034615.
Machine translation of JP 2008-80652.
Office Action in CN 201010288590.4 and English translation.
English abstract of CN 1154291.

\* cited by examiner

FIG.4
SECURITY JUDGMENT CONDITION TABLE

| SECURITY JUDGMENT CONDITIONS | | TAKING-OUT PERSON | NEED FOR AUTHENTICATION REQUEST |
|---|---|---|---|
| PRINT JOB NAME | OUTPUT DESTINATION | | |
| SEPTEMBER BILL | OSAKA BRANCH | USER A | NECESSARY |
| SUMMER VACATION SCHEDULE | SAPPORO BRANCH | — | UNNECESSARY |
| PAY SLIPS | SENDAI BRANCH | GROUP 01 | NECESSARY |
| SALES LIST FOR YEAR X | FUKUOKA BRANCH | USER B | NECESSARY |

FIG.5
USER LIST

| | IMAGE FORMING DEVICE 30 | IMAGE FORMING DEVICE 31 | IMAGE FORMING DEVICE 32 |
|---|---|---|---|
| USER A (GROUP 1) | ○ | ○ | — |
| | 1234567 | 76543210 | — |
| USER B (GROUP 1) | — | ○ | ○ |
| | — | 3335620 | 3335620 |
| USER C (GROUP 3) | ○ | — | ○ |
| | 45699807 | — | 45699807 |
| USER D (GROUP 2) | ○ | ○ | ○ |
| | 46235891 | 77521480 | 6980021 |

GROUP CONFIDENTIAL BOX TABLE

| GROUP NAME | CORRESPONDING CONFIDENTIAL BOX NUMBER |
|---|---|
| GROUP 1 | 991 |
| GROUP 2 | 992 |
| GROUP 3 | 993 |
| GROUP 4 | 994 |

FIG.11 EXAMPLE OF PRINT DATA IN BASIC SYSTEM

BANNER SHEET 90

```
************************
*                      *
* SEPTEMBER BILL TO X CARD COMPANY *
*                      *
*                      *
*PRINT JOB NAME: SEPTEMBER BILL    OUTPUT DESTINATION: OSAKA BRANCH
*JOB NUMBER: SRCM0101              DIVISION NAME: CARD OPERATIONS DIVISION
*NUMBER OF PAGES: 1000             PLACE OF OUTPUT: X BUILDING, 12TH FLOOR
*                                  USER NAME: TARO FUJI
*                      *
************************
```

FORM PAGE 91

SEPARATOR SHEET 92

CUSTOMER NAME: X CARD COMPANY

BRANCH-IN-CHARGE CODE: 003

FIG.12

| EXTRACTED INFORMATION TABLE | |
|---|---|
| PRINT JOB NAME | SEPTEMBER BILL |
| TITLE | SEPTEMBER BILL TO X CARD COMPANY |
| OUTPUT DESTINATION | OSAKA BRANCH |
| DIVISION NAME | CARD OPERATIONS DIVISION |
| PLACE OF OUTPUT | X BUILDING, 12TH FLOOR |
| USER NAME | TARO FUJI |

BANNER SHEET 90

SEPTEMBER BILL TO X CARD COMPANY

OUTPUT DESTINATION: OSAKA BRANCH
DIVISION NAME: CARD OPERATIONS DIVISION
PLACE OF OUTPUT: X BUILDING, 12TH FLOOR
USER NAME: TARO FUJI

PRINT JOB NAME: SEPTEMBER BILL
JOB NUMBER: SRCM0101
NUMBER OF PAGES: 1000

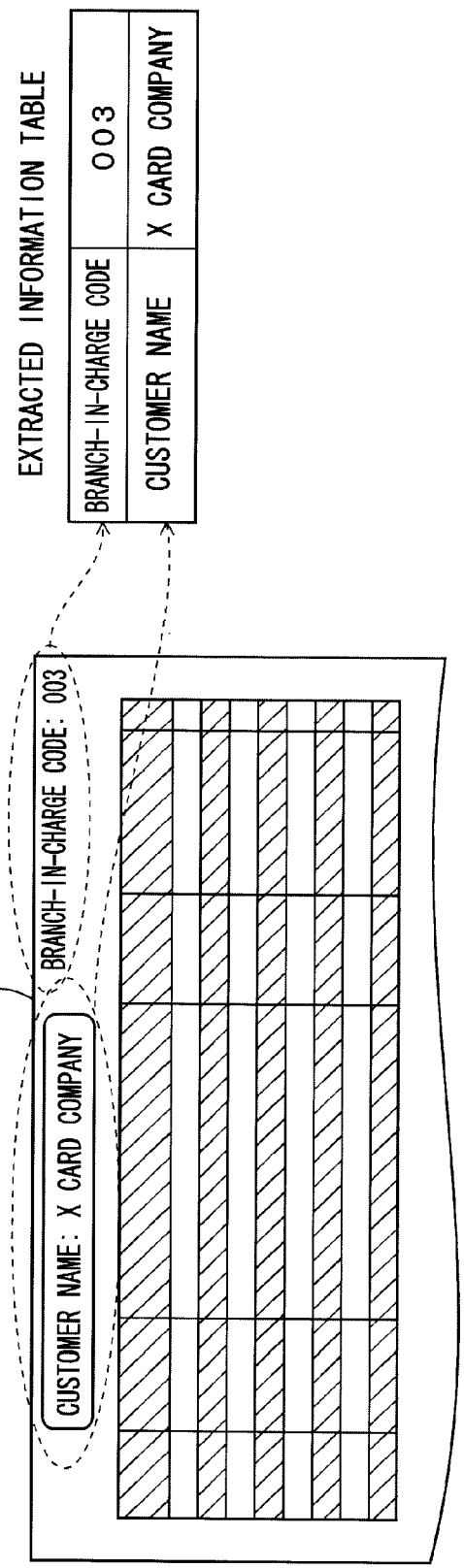

FIG.16

| ATTRIBUTE | USER NAME | AUTHENTICATING USER ID | NOTIFICATION METHOD | NOTIFICATION DESTINATION |
|---|---|---|---|---|
| AAA | USER A | use¥raaa | E-mail | user-A@***.co.jp |
| BBB | USER B | user¥bbb | MESSAGE | 129.249.99.50 |
| CCC | USER C | user¥ccc | E-mail | user-C@***.co.jp |
| ... | USER ... | user¥... | ..... | ...... |

# PRINT JOB INFORMATION MANAGING DEVICE, PRINT JOB INFORMATION MANAGING METHOD, AND RECORDING MEDIUM

BACKGROUND

Technical Field

The present invention relates to a print job information managing device, a print job information managing method, and a recording medium.

SUMMARY

The present invention provides a print job information managing device, a print job information managing method, and a recording medium that can contrive to increase the speed of printing processing of an authentication-added print job.

A print job information managing device of a first aspect of the present invention has: an authentication request instruction adding section that adds, to a print job, an authentication request instruction that expresses whether or not authentication is needed at a time of printing; a transmitting section that transmits the print job to a printer; and a notification section that, when the authentication request instruction has been added to the print job transmitted by the transmitting section, notifies a printing recipient that the print job has been transmitted.

BRIEF DESCRIPTION OF THE DRAWINGS

Exemplary embodiments of the present invention will be described in detail based on the following figures, wherein:

FIG. 4 is a security judgment condition table that is used at the time of judgment processing at a judging section;

FIG. 5 is a user list table that is used when an authentication request instruction adding section adds an authentication request to a print job;

FIG. 11 is a front view of recording sheets that are printed in the printing system relating to the present exemplary embodiment;

FIG. 12 is a diagram of the flow up until the generation of an extracted information table by the extracting of information from a banner sheet relating to the present exemplary embodiment;

FIG. 13 is a diagram of the flow up until the generation of an extracted information table by the extracting of information from a form page relating to the present exemplary embodiment;

FIG. 16 is a schematic drawing of an authentication condition table that is stored in an authentication condition table storing section relating to the present exemplary embodiment;

DETAILED DESCRIPTION

Figure 1:
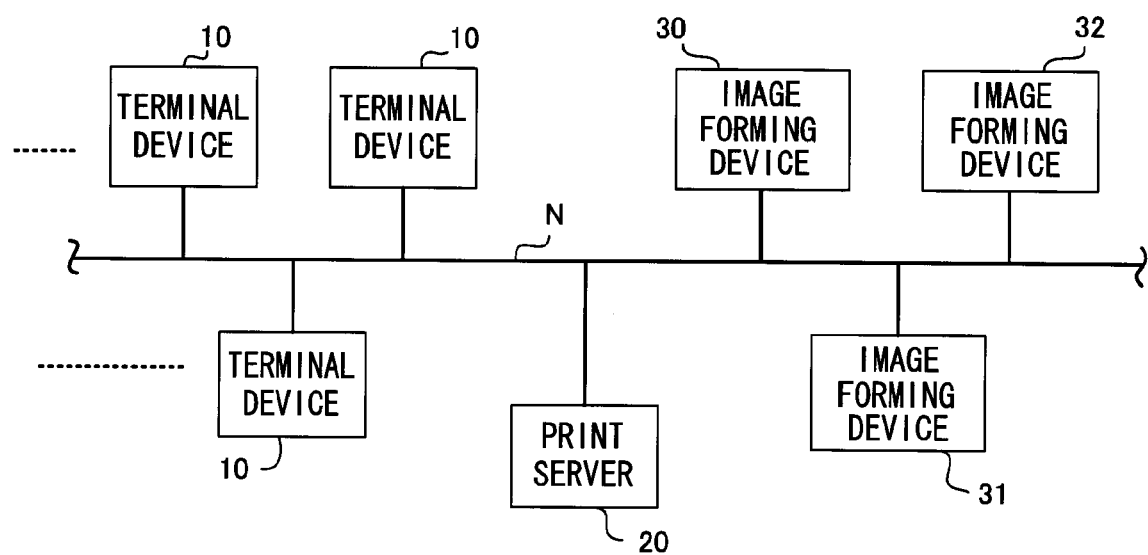
FIG. 1 is a schematic drawing of a printing system relating to an exemplary embodiment.

A printing system relating to an exemplary embodiment is shown in FIG. 1. Terminal devices 10 generate print jobs, and transmit the generated print jobs to a print server 20 via a communication line network N.

Here, a print job expresses, for example, information that is described in page description language, and is information of a form that an image forming device can interpret, and is information that is interpreted by an image forming device and converted into bitmap data.

The print server 20 functions as a print control device, and transmits a received print job to any of image forming devices 30 through 32. Note that there are also cases in which the print server 20 transmits a print job to plural image forming devices among the image forming devices 30 through 32. The image forming devices 30 through 32 receive print jobs transmitted from the print server 20, and output images that are based on the received print jobs onto printing sheets.

(Print Server 20)

Figure 2:
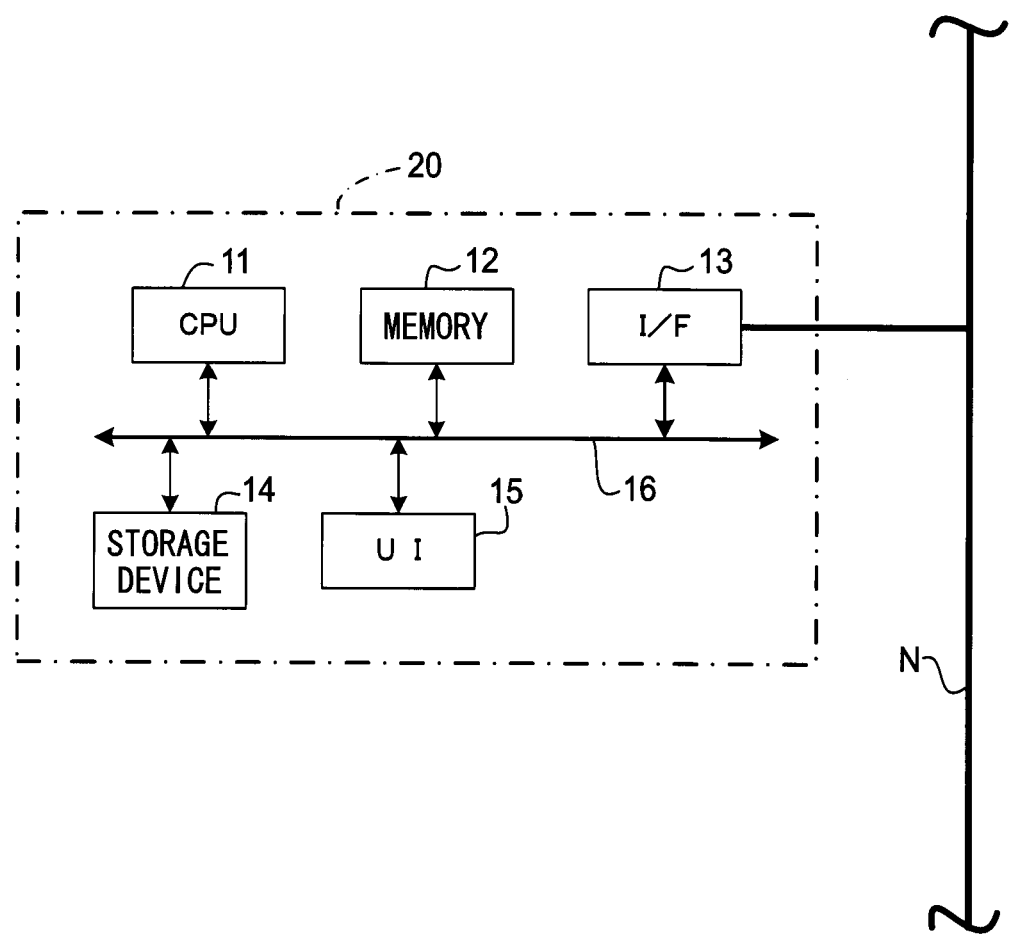
FIG. 2 is a block diagram showing hardware structures of a print server relating to the present exemplary embodiment.

As shown in FIG. 2, the print server 20 has a CPU 11, a memory 12, a communication interface (I/F) 13 that carries out transmission and receipt of data with external devices and the like, a storage device 14 such as a hard disk drive (HDD) or the like, and a user interface (UI) 15 that includes a touch panel or a liquid crystal display and a keyboard. These structural elements are connected to one another via a control bus 16.

The CPU 11 executes predetermined processings on the basis of control programs that are stored in the memory 12 or the storage device 14, and controls the operations of the print server 20. Note that, in the present exemplary embodiment, explanation is given of a case in which the CPU 11 reads-out and executes control programs that are stored in the memory 12 or the storage device 14. However, these programs can be stored on a storage medium such as a CD-ROM or the like and provided to the CPU 11.

Figure 3:
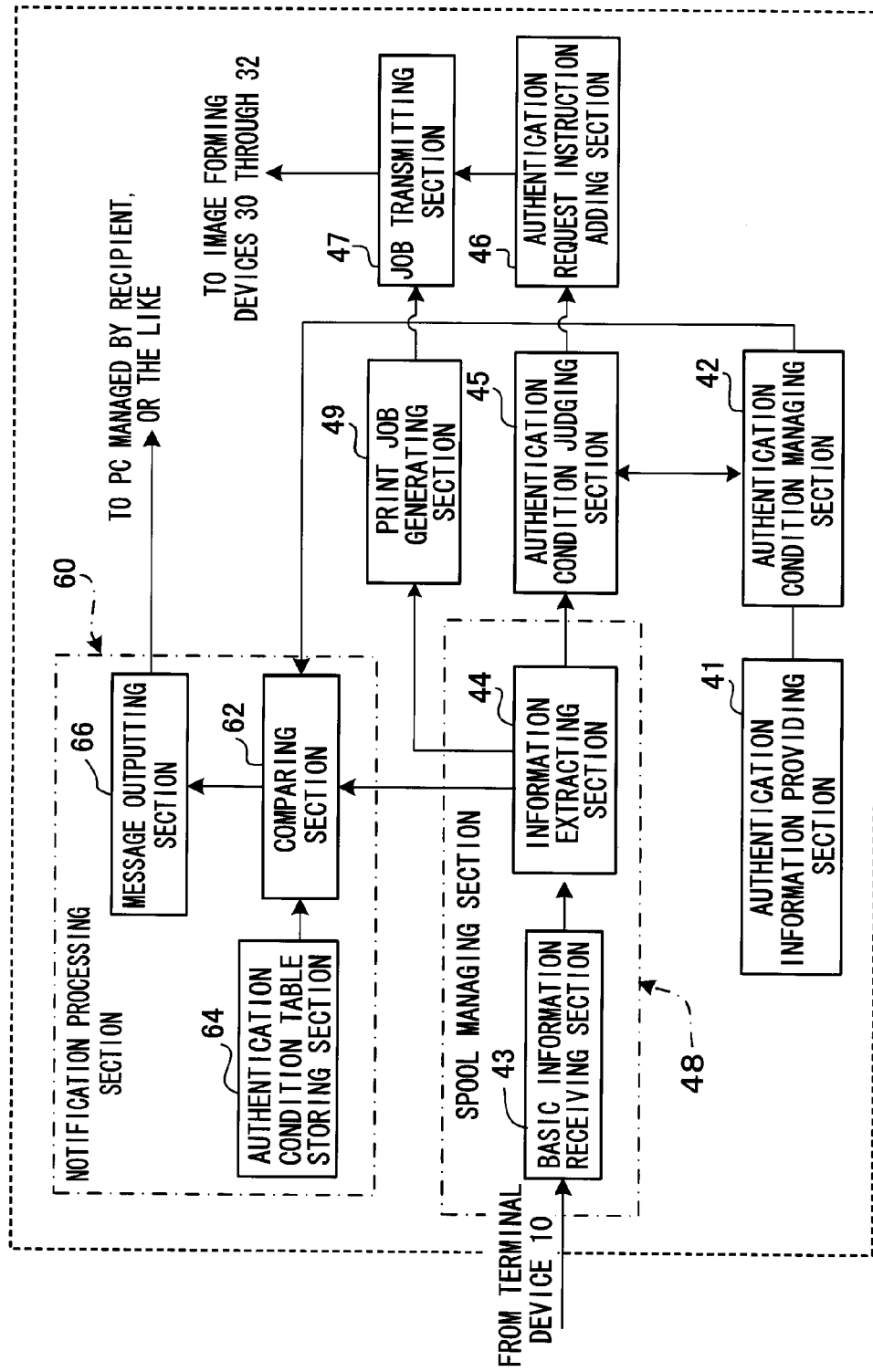
FIG. 3 is a functional block diagram based upon processings executed at a CPU of the print server relating to the present exemplary embodiment.

The print server 20 receives basic information for printing from the terminal device 10. On the basis of whether or not authentication is to be carried out, and the attributes of the image forming devices connected on the communication line network N, and the like, the print server 20 generates a print job and stores the print job, and sends the print job out to the image forming device 30 through 32. FIG. 3 is a block diagram showing the functional structures from generation of a print job to the sending-out of the print job, that are executed mainly at the CPU 11.

As shown in FIG. 3, an authentication information providing section 41 sets security judgment conditions for judging whether or not a received print job is a print job that requires authentication when carrying out printing processing on the basis of that print job.

For example, the authentication information providing section 41 sets, as the security judgment conditions, whether or not any one of or combination of at least two or more of information that are the print job name (print instruction name), the title, the output destination, the user name and the customer name that are included in the print job, matches information that has been set in advance. An authentication condition managing section 42 stores a security judgment condition table (see FIG. 4) that is set by the authentication information providing section 41.

A basic information receiving section 43, that structures a portion of a spool managing section 48, receives basic information that is transmitted-in from the terminal devices 10. Note that the basic information is text information for generating a print job, and is sent-in divisionally from plural terminal devices 10 or is sent-in successively in time sequence. This information is collected at the print server 20 and generated as a print job.

An information extracting section 44, that is another portion of the spool managing section, extracts specific information, that is set in advance, from the basic information received by the basic information receiving section 43.

The information extracting section 44 extracts the basic information, and sends the basic information to a print job generating section 49. On the basis of the basic information, the print job generating section 49 generates a print job, and sends the print job to a job transmitting section 47. The job transmitting section 47 waits for authentication for the print job.

An authentication condition judging section 45 judges whether or not the basic information that was received by the basic information receiving section 43 matches the security judgment conditions that were set by the authentication information providing section 41. Specifically, the authentication condition judging section 45 judges whether or not authentication information, that is added information of the basic information extracted by the information extracting section 44, matches the security judgment conditions that were set by the authentication information providing section 41.

The security judgment condition table shown in FIG. 4 is used at the time of the judgment processing that the authentication condition judging section 45 carries out.

In the security judgment condition table shown in FIG. 4, conditions that are the name of the print job and the output destination are set as the security judgment conditions. For example, for a print job for which "September bill" is set as the print job name and "Osaka branch" is set as the output destination, condition setting that is such that it is judged that an authentication request is needed is carried out. Further, for this print job, setting is carried out such that "user A" is designated as the recipient.

As shown in FIG. 3, when basic information that was received by the basic information receiving section 43 has been judged at the authentication condition judging section 45 to match the security judgment conditions, an authentication request instruction adding section 46 adds an authentication request instruction to that basic information. When an authentication request instruction has been added, printing of the print job onto a sheet is not carried out, and printing of the print job onto a sheet is carried out when authentication, such as authentication of the user or the like, is carried out. Namely, when an authentication request instruction has been added, the printing is handled as confidential printing. Note that an authentication request instruction is used as an example of information expressing that a print job is a print job for which authentication is needed when printing processing on the basis of the print job is carried out.

Concretely, the authentication request instruction adding section 46 adds an authentication request instruction by setting a recipient and a password for a print job that is transferred from the job transmitting section 47.

Here, the authentication request instruction includes at least information expressing that the print job is a print job for which authentication is needed when printing processing onto a medium such as a sheet or the like is carried out on the basis of the print job.

The authentication request instruction may be information other than the recipient or the password, and information corresponding to any of various types of authentication techniques may be added.

FIG. 5 shows an example of a user list that is used when the authentication request instruction adding section 46 adds an authentication request to a print job.

For example, when "user A" has been designated as the recipient at the authentication condition judging section 45, on the basis of the user list shown in FIG. 5, the authentication request instruction adding section 46 sets "1234567" as the password if the output destination is the image forming device 30, and sets "76543210" as the password if the output destination is the image forming device 31. Note that, if a group has been designated as the recipient, the authentication request instruction adding section 46 sets only the fact that an authentication request is needed, and the recipient, at the print job.

The job transmitting section 47 transfers, to the image forming device 30 through 32, the print job that has been received by the basic information receiving section 43 and to which an authentication request instruction has been added by the authentication request instruction adding section 46.

(Print Job Managing Control at Print Server 20)

Here, in the present exemplary embodiment, when there is an authentication request instruction at a print job that is being managed at the print server 20, the recipient is notified that the print job has been transmitted to the image forming device 30 through 32.

Note that this notification may be limited to special print jobs that are authentication-added print jobs and at which the sender and recipient of the print job are different.

Namely, a notification processing section 60 is provided at the print server 20 shown in FIG. 3. The notification processing section 60 has a comparing section 62, an authentication condition table storing section 64, and a message outputting section 66.

The comparing section 62 acquires authentication information from the information extracting section 44, and reads-out the security judgment condition table (see FIG. 4) from the authentication condition managing section 42.

The comparing section 62 is connected to the authentication condition table storing section 64. The authentication condition table shown in FIG. 16 is stored in the authentication condition table storing section 64. The comparing section 62 reads-out this authentication condition table.

Items that are the user name (i.e., the recipient), the authenticating user ID, the method of notification, and the notification destination are provided in the authentication condition table so as to be classified per attribute (for example, so as to correspond to the attributes or the like).

At the comparing section 62, the attribute is specified on the basis of the authentication information and the security judgment condition table.

The recipient information of each item of the specified attribute is send-out to the message outputting section 66. The notification message shown in FIG. 17 is generated, and is outputted to a PC or the like that the user manages.

Figure 17:
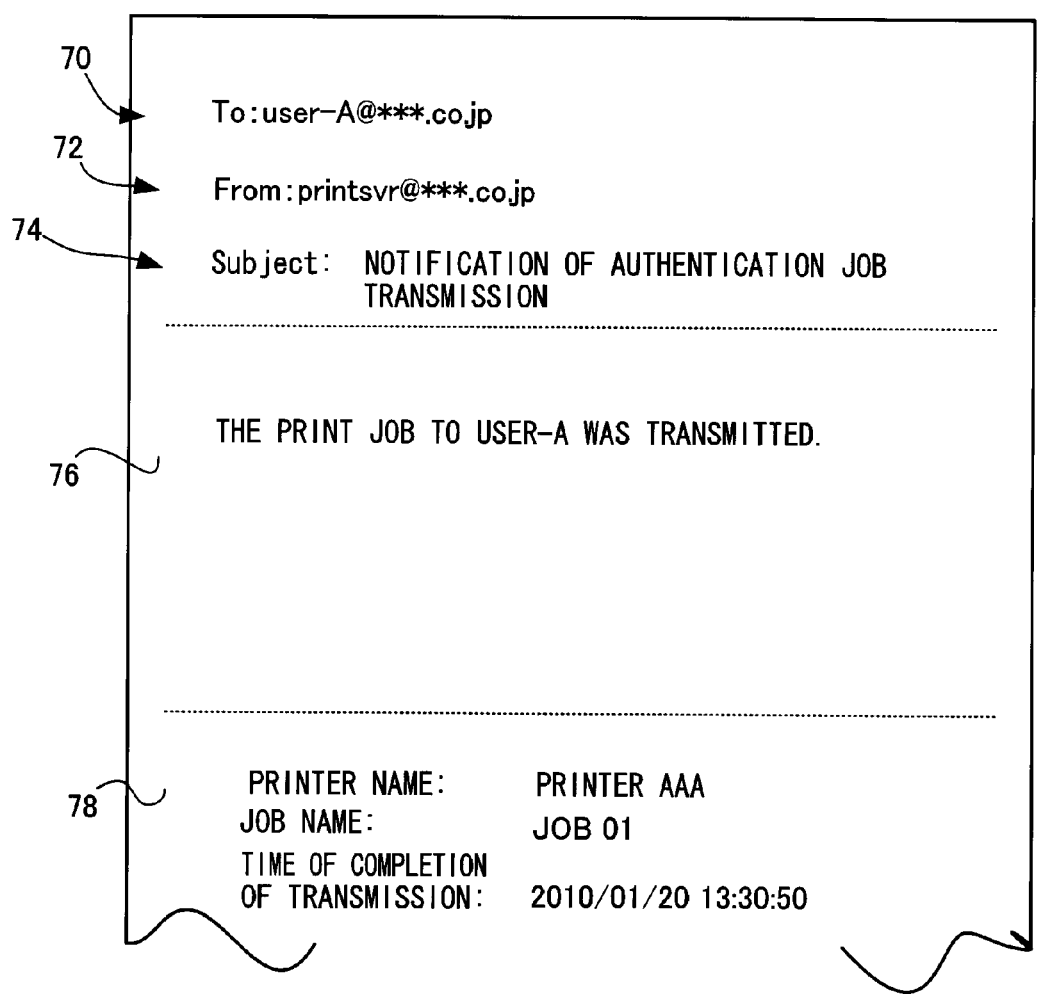
FIG. 17 is a front view of a notification message relating to the present exemplary embodiment.

FIG. 17 is an example of the notification message, and is based on the transmission format for email. Namely, an addressee (To) line area 70, a sender (From) line area 72, and a subject matter (Subject) line area 74 are provided in the uppermost part. A message writing area 76 is provided in the middle part, and an information recording area 78 of the image forming device from which the print job is to be outputted is provided at the lower part.

(Image Forming Devices 30 Through 32)

Because the basic control structures of the image forming devices 30 through 32 are similar, the structure of the image forming device 30 is described hereinbelow.

Figure 6:
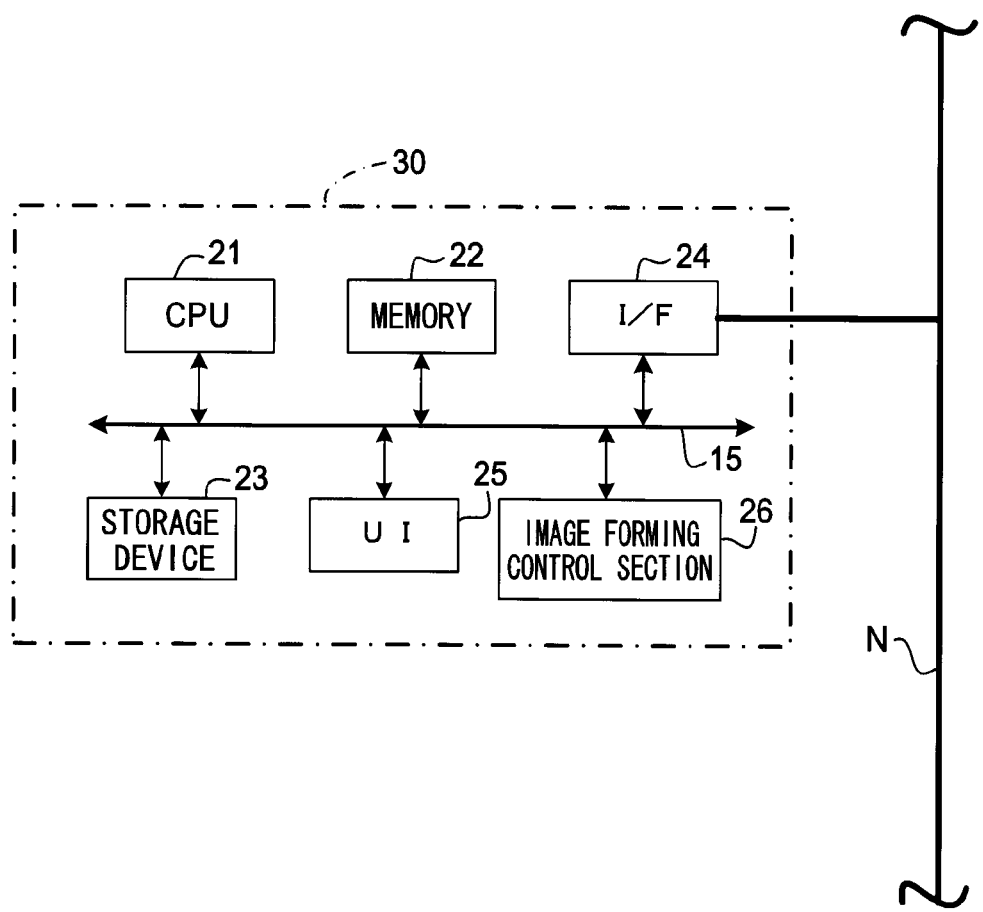
FIG. 6 is a block diagram showing the hardware structures of an image forming device relating to the present exemplary embodiment.

As shown in FIG. 6, the image forming device 30 has a CPU 21, a memory 22, a storage device 23 such as a hard disk drive (HDD) or the like, an interface (I/F) 24 that carries out transmission and receipt of data with external devices and the like via the communication line network N, a user interface (U/I) 25 including a touch panel or a liquid crystal display and a keyboard, and an image formation control section 26. These structural elements are connected to one another via a control bus 25.

The CPU 21 executes predetermined processings on the basis of control programs that are stored in the memory 22 or the storage device 23, and controls the operations of the image forming device 30. Note that, in the present exemplary embodiment, explanation is given of a case in which the CPU 21 reads-out and executes control programs that are stored in the memory 22 or the storage device 23. However, the programs can be stored on a storage medium, such as a CD-ROM or the like, and presented to the CPU 21.

Figure 7:
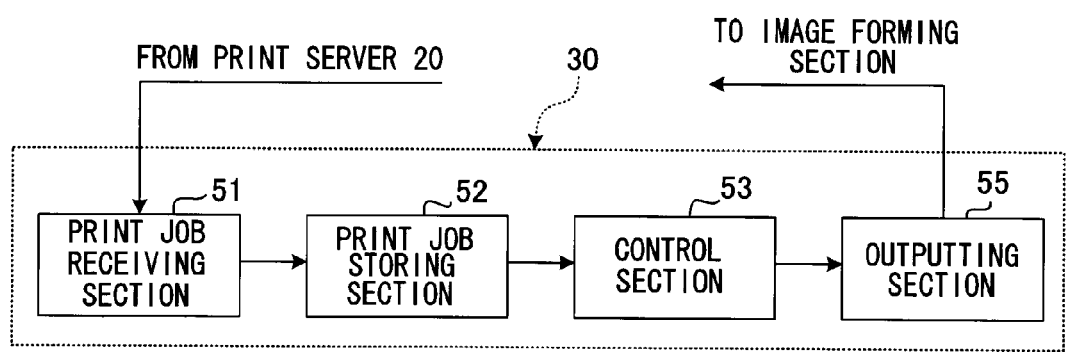
FIG. 7 is a functional block diagram based upon processings executed at a CPU of the image forming device relating to the present exemplary embodiment.

When the image forming device 30 receives a print job, the image forming device 30 forms an image on a predetermined recording sheet. FIG. 7 is a block diagram showing the functional structures of the image forming processing that is based on a print job and that is executed mainly by the CPU 21.

As shown in FIG. 7, a print job receiving section 51 receives a print job that is transmitted-in from the print server 20. A print job storing section 52 stores the print job that is received by the print job receiving section 51.

In accordance with control of a control section 53, an outputting section 55 outputs an image on the basis of the print job received by the print job receiving section 51 and stored in the print job storing section 52. The control section 53 controls the image outputting processing at the outputting section 55.

When an authentication request instruction has been added to a print job for which image outputting processing is to be carried out, an authentication processing executing section (not shown) executes authentication processing before the print job is executed at the outputting section 55. The authentication processing that is executed by the authentication processing executing section here may be authentication processing such as inputting the password by keyboard input or the like, or may be authentication processing using an IC card or the like. Or, a method based on physiological information using a fingerprint, vein pattern, iris pattern, or the like may be used for the authentication processing.

Figures 8, 9:
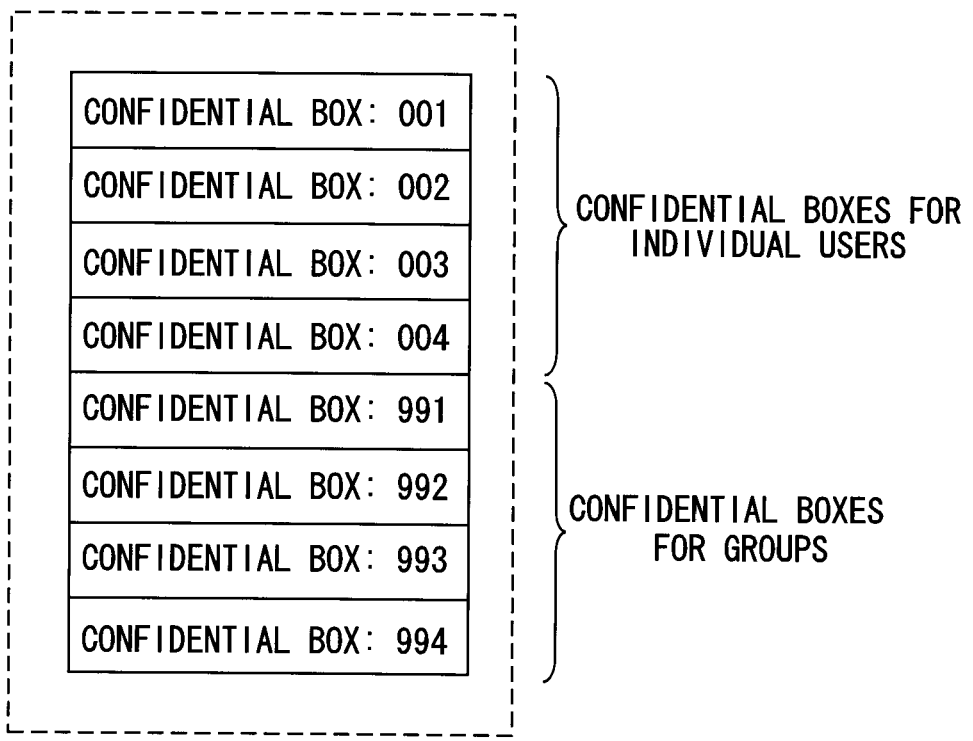
FIG. 8 is a group confidential box table relating to the present exemplary embodiment.
FIG. 9 is a diagram showing confidential boxes that are set at the image forming device relating to the present exemplary embodiment.

Note that, when an authentication request instruction in which a group is designated as the recipient has been added to a print job for which image outputting processing is to be carried out, a confidential box in which the print job should be stored is designated on the basis of a group confidential box table such as shown in FIG. 8, and the print job is stored in that confidential box.

An example of confidential boxes that are set at the image forming device is shown in FIG. 9. In the example shown in FIG. 9, confidential boxes "001" through "004" are set so as to store print jobs whose recipients are individual users, and confidential boxes "991" through "994" are set so as to store print jobs whose recipients are groups.

For example, a print job, to which is added an authentication request instruction in which group 1 is designated as the recipient, is stored in confidential box number "991". In order to execute the print job stored in this confidential box number "991", authentication processing by input of a password set in advance is required.

Operation of the printing system of the present exemplary embodiment is described next.

Figure 10:
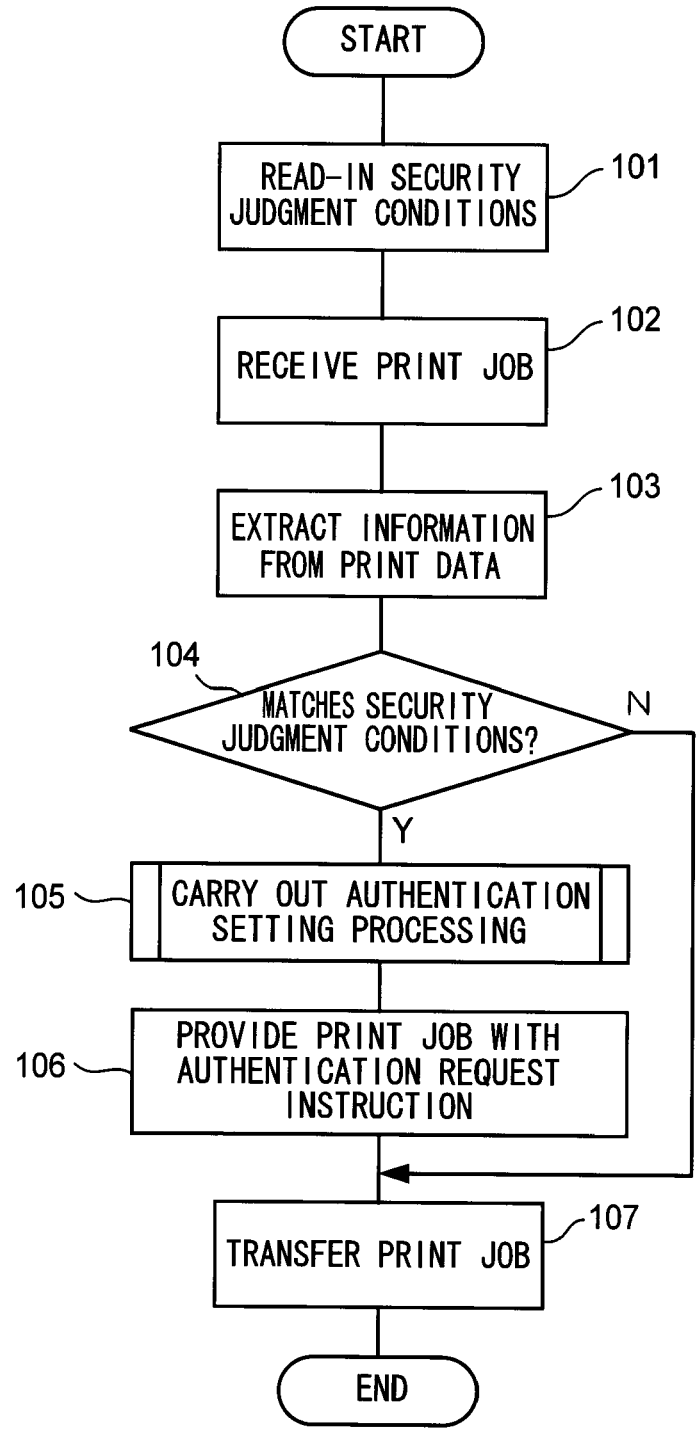
FIG. 10 is a flowchart showing operations of the print server in the printing system relating to the present exemplary embodiment.

First, operation of the print server 20 in the printing system of the present exemplary embodiment is described with reference to the flowchart of FIG. 10.

At the print server 20, the authentication condition judging section 45 reads-in, in advance, the security judgment conditions from the authentication condition managing section 42 (step 101).

Then, when the basic information receiving section 43 receives a print job from the terminal device 10 (step 102), the information extracting section 44 extracts information from the print job (step 103).

Concrete description will be given by using, as an example, a case in which the print data shown in FIG. 11 is received. The print data shown in FIG. 11 is structured such that the leading page is a banner sheet 90 that includes various types of information, and plural form pages 91 that are actually used continue in the following pages. A separator sheet 92 is provided at the boundary between this print data and other print data.

For example, when information is extracted from the banner sheet 90, as shown in FIG. 12, the information extracting section 44 extracts the information such as the title, the output destination, the division name, the place of output, and the user name, and generates an extracted information table.

Further, when information is extracted from the form pages 91, as shown in FIG. 13, the information extracting section 44 extracts information such as the code of the branch in charge, the name of the customer, and the like, and generates an extracted information table.

On the basis of the extracted information tables generated by the information extracting section 44, the authentication condition judging section 45 judges (step 104) whether or not a print job that is to be transferred matches the security judgment conditions that were read-in from the authentication condition managing section 42.

Various types of authentication setting processings are carried out (step 105) in order to set an authentication request instruction at the print job. Details of the authentication setting processing are described hereinafter.

The authentication request instruction adding section 46 adds an authentication request instruction to the print job (step 106). The job transmitting section 47 transfers the print job, to which the authentication request instruction has been added, to the image forming device 30 through 32 (step 107).

Note that, in step 104, if it is judged that the print job that is to be transferred does not match the security judgment conditions, the print job received by the basic information receiving section 43 is transferred to the image forming device 30 through 32 by the job transmitting section 47 without an authentication request instruction being added thereto.

Figure 14:
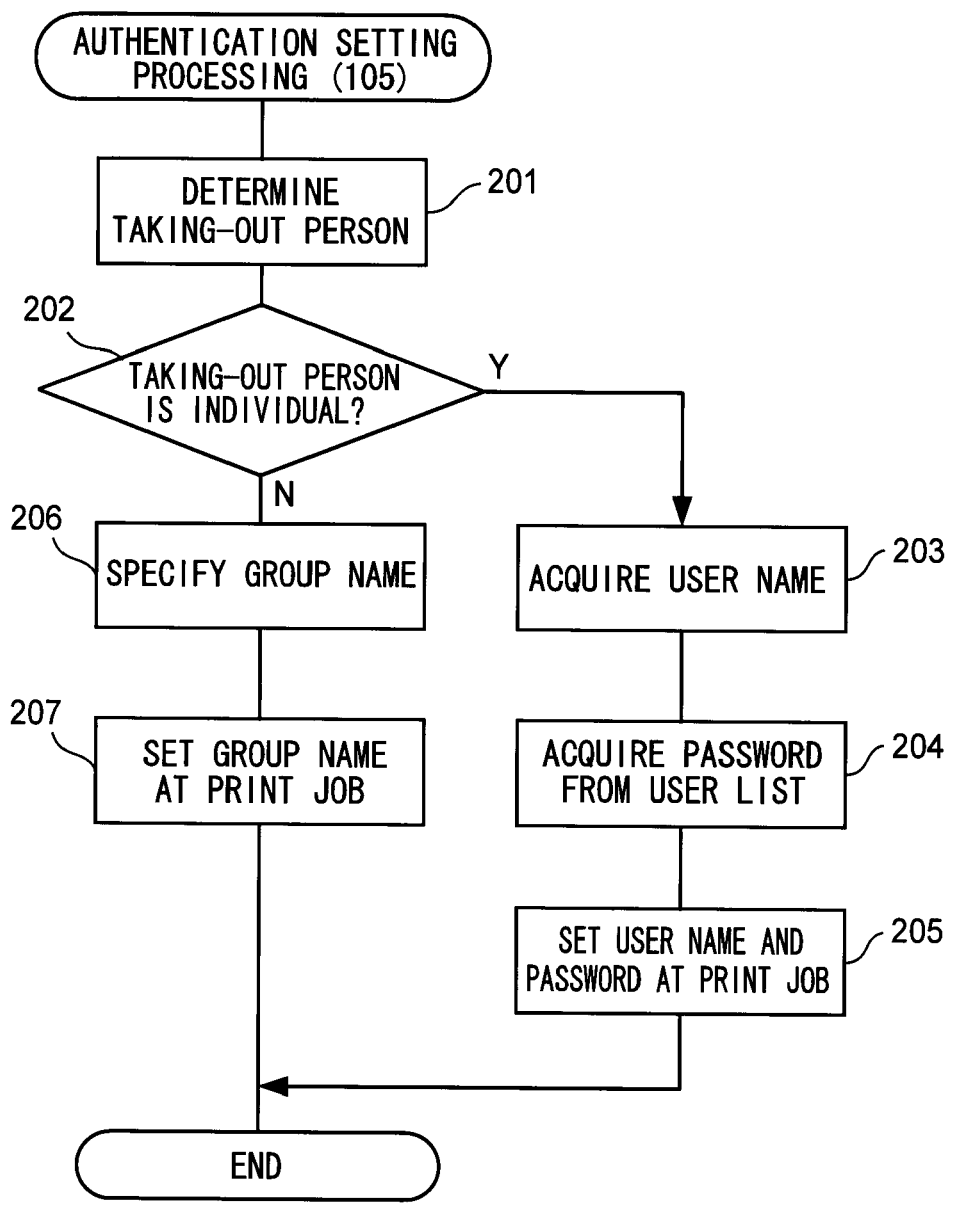
FIG. 14 is a flowchart that explains, in detail, the authentication setting processing shown in step 105 of FIG. 10, relating to the present exemplary embodiment.

Details of the authentication setting processing shown in step 105 of FIG. 10 will be described next with reference to the flowchart of FIG. 14.

In the authentication setting processing, determining of the recipient is carried out (step 201) on the basis of a security judgment condition table such as shown in FIG. 4. If the recipient is an individual (Yes in step 202), setting of a password is carried out (step 203 through step 205).

In step 202, if it is judged that the recipient is a group and not an individual (No in step 202), specifying of the group name and setting of the group name for the print job are carried out (step 206, step 207).

Figure 15:
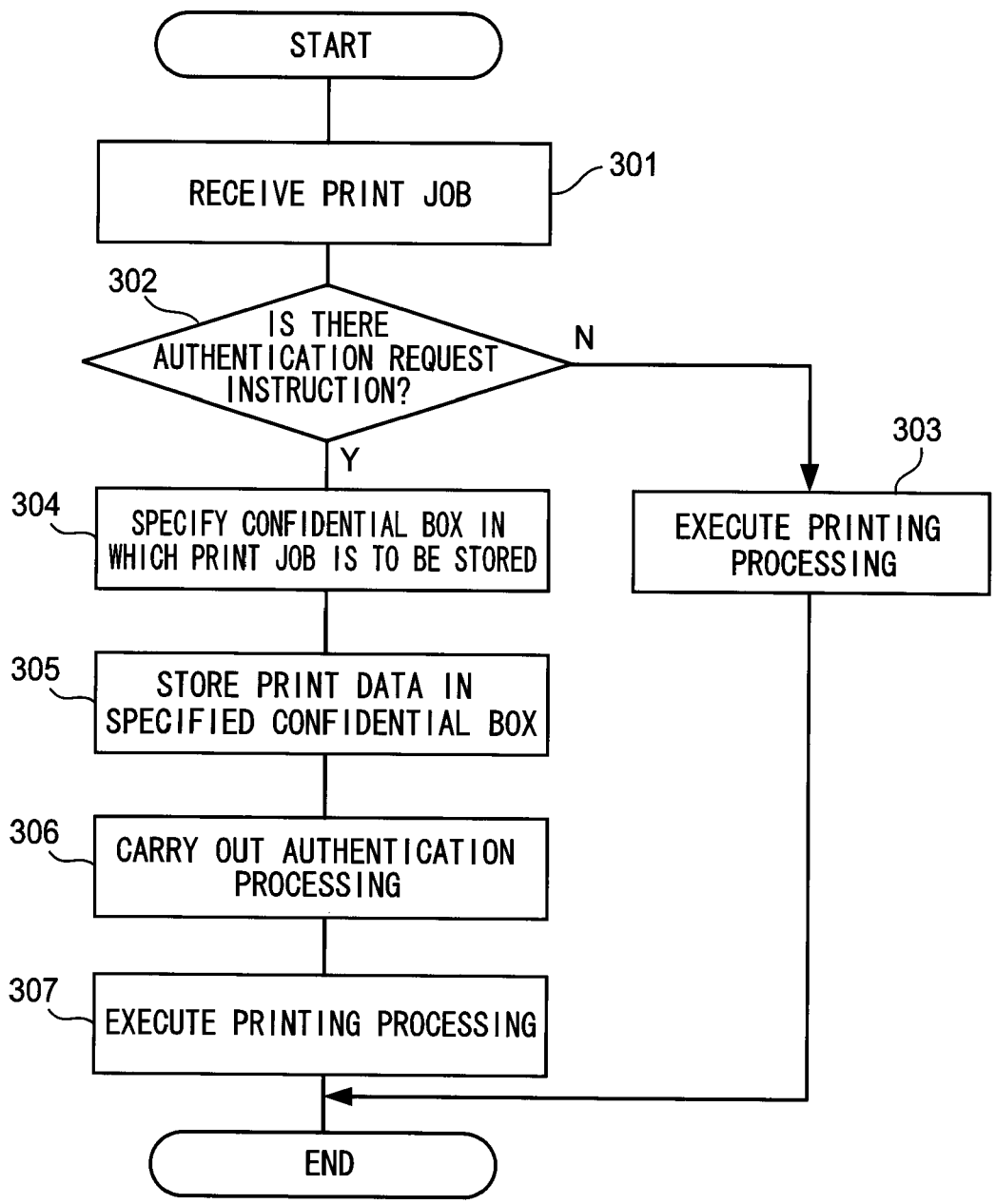
FIG. 15 is a flowchart for explaining operation of the image forming device that has received a print job, relating to the present exemplary embodiment.

Operation when a print job, to which an authentication request instruction is added in this way, is received at the image forming device 30 is described with reference to the flowchart of FIG. 15.

When a print job from the print server 20 is received at the print job receiving section 51 and is stored in the print job storing section 52 (step 301), the control section 53 judges whether or not an authentication request instruction is added to the print job (step 302).

In step 302, if it is judged that an authentication request instruction is not added to the received print job, usual printing processing in which an authentication request is not carried out is executed, and the outputting section 55 carries out image outputting processing that is based on the received print job (step 303).

In step 302, if it judged that an authentication request instruction is added to the received print job, the confidential box in which the print job is to be stored is specified (step 304), and the print data is stored in the specified confidential box (step 305).

When a user carries out image outputting processing of the print job, an authentication request, such as a request for password input or the like, is carried out. If normal authentication processing is carried out (step 306), image outputting processing that is based on the received print job is carried out at the outputting section 55 (step 307).

(Control of Notification, by Print Server 20, to Recipient of Authentication Information Added Print Job)

Figure 18:
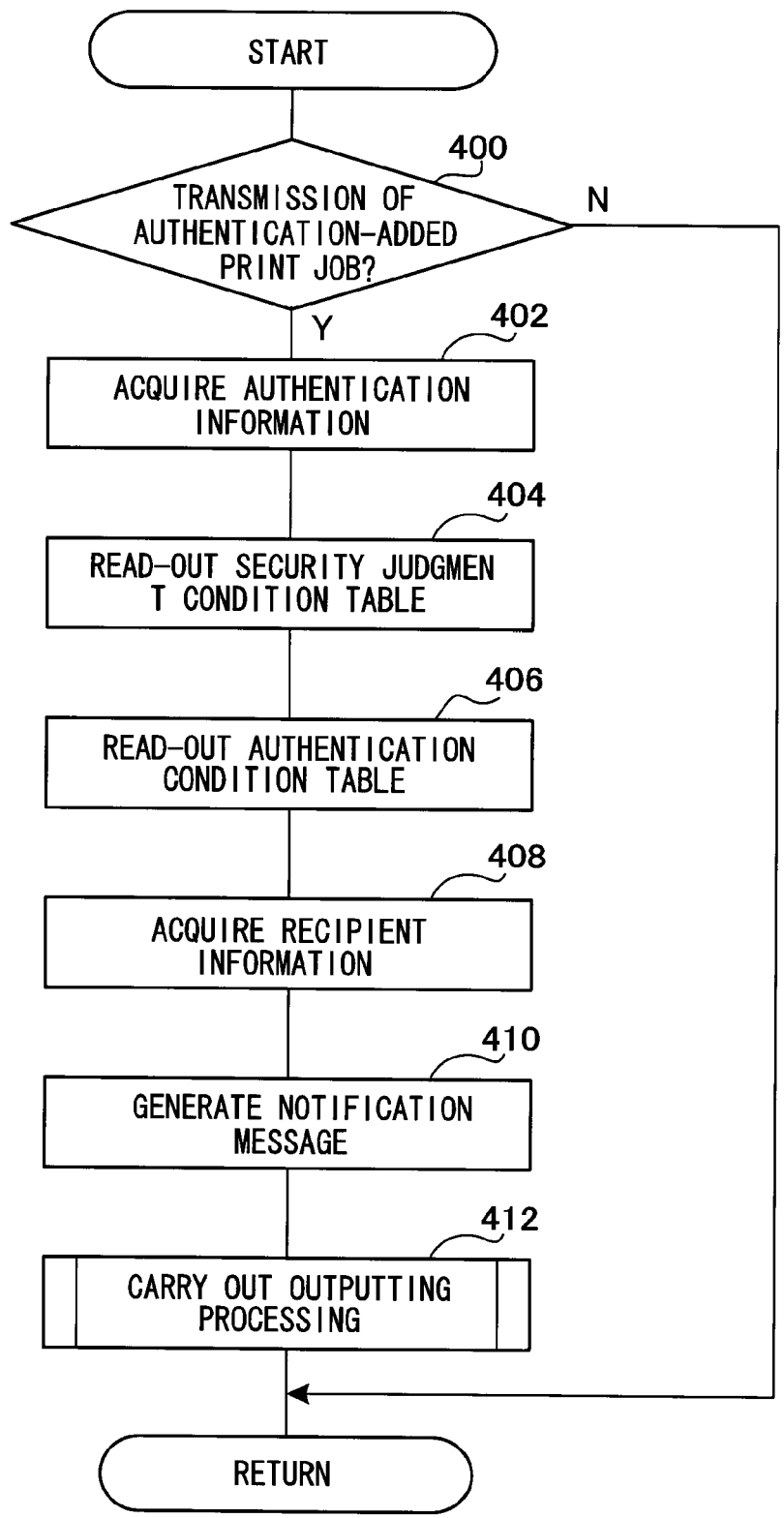
FIG. 18 is a flowchart showing the flow of control of notifying a recipient, at the print server.

The flow of the control, at the print server 20, of notifying the recipient is described next in accordance with the flowchart of FIG. 18. Note that the flowchart of FIG. 18 is executed in succession after above-described FIG. 10.

In step 400, it is judged whether or not the print job transmitted to the image forming device 30 through 32 is an authentication-added print job. If the judgment in step 400 is negative, the print job is not an authentication-added print job, and therefore, the routine ends.

If the judgment in step 400 is affirmative, the print job transmitted to the image forming device 30 through 32 is an authentication-added print job, and the routine proceeds to step 402.

In step 402, authentication information is acquired from the information extracting section 44. Next, the routine moves on to step 404 where the security judgment condition table is read-out from the authentication condition managing section 42, and the routine proceeds to step 406.

In step 406, the authentication condition table is read-out. Next, the routine proceeds to step 408 where the attribute is specified and the recipient information is acquired, and the routine moves on to step 410.

In step 410, on the basis of the acquired recipient information, a notification message (see FIG. 17) is generated, and is outputted to the PC or the like that the recipient manages (step 412).

Note that, in the present exemplary embodiment, the objects of notification message transmission are all of the authentication-added print jobs. However, when the sender and the recipient are the same, transmitting a notification message may be troublesome on the contrary. Thus, notification messages may be transmitted only for special print jobs that are authentication-added print jobs and whose print job sender and recipient are different. Further, even if the sender and recipient are the same, notification may be given to a sender (recipient) who is registered in advance.

Moreover, the image forming devices 30 through 32 may communicate with one another, and notification messages may be transmitted only for print jobs that are not printed within a predetermined time period.

Still further, a notification message may be sent in response so as to reply to an inquiry from the recipient.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A print job information managing device comprising:
    spool managing section comprising a basic information receiving section that receives basic information from terminal devices and an information extracting section that extracts pre-set specific information from the received basic information;
    a judging section that determines whether or not the specific information extracted by the information extracting section matches security judgment conditions;
    an authentication request instruction adding section that adds, to a print job, an authentication request instruction that expresses whether or not authentication is needed by a printing recipient at a time of printing;
    a transmitting section that transmits the print job to a printer according to the instruction by a printing sender; and
    a notification section that, when the authentication request instruction has been added to the print job transmitted by the transmitting section, notifies the printing recipient that the print job has been transmitted;
    wherein the authentication request instruction adding section adds the authentication request instruction to the print job before the print job is transmitted by the transmitting section, by setting the printing recipient and a password;
    the judging section judges whether or not the authentication request instruction is to be added on the basis of the extracted information and the security judgment conditions;
    when the judging section has judged that the authentication request instruction is to be added, the authentication request instruction adding section adds the authentication request instruction to the print job; and the judging section judges whether or not the authentication request instruction is to be added, by judging, on the basis of an extracted information table generated by the information extracting section, whether or not the print job matches the security judgment conditions that are read-in from an authentication condition managing section.

2. The print job information managing device of claim 1, further comprising a search section that searches for the printing recipient, wherein the search section has:
a storing section that stores a table of at least recipient information that requires authentication; and
a specifying section that, on the basis of information included in the print job, refers to the table of the recipient information that is stored in the storing section, and specifies the printing recipient.

3. The print job information managing device of claim 2, wherein, only for print jobs that are not printed within a predetermined time period, a sender of the print job is notified that the print job has been transmitted to the recipient.

4. The print job information managing device of claim 2, wherein, only for special print jobs whose sender and printing recipient are different, the sender of the print job is notified that the print job has been transmitted to the recipient.

5. The print job information managing device of claim 2, wherein, when at least one of a sender and the printing recipient of the print job is registered in advance, the sender of the print job is notified that the print job has been transmitted to the recipient.

6. A non-transitory computer readable medium storing a print job information managing program that causes a computer to operate as the print job information managing device of claim 1.

7. The print job information managing device of claim 1, wherein the specific information extracted by the information extracting section includes at least one of a print job name or an output destination.

8. The print job information managing device of claim 1, wherein if the specific information extracted by the information extracting section matches security judgment conditions, the judging section determines a printing recipient of the print job based on the security judgment conditions.

9. The print job information managing device of claim 1, wherein the security judgment conditions are stored in a security judgment condition table.

10. The print job information managing device of claim 1, wherein the authentication request instruction adding section sets the password based on a user list.

11. The print job information managing device of claim 1, wherein the information extracting section generates an extracted information table storing the specific information extracted by the information extracting section, and the judging section determines whether or not the specific information extracted by the information extracting section matches the security judgment conditions based on the extracted information table.

12. The print job information managing device of claim 1, wherein the notification section comprises a comparing section that reads out an authentication condition table that includes items of user name, user ID, method of notification, and notification destination, which are classified by attributes.

13. The print job information managing device of claim 12, wherein the comparing section specifies an attribute of the print job from the authentication condition table based on the specific information extracted by the information extracting section and the security judgment conditions that are stored in a security judgment condition table.

14. A print job information managing device comprising:
a spool managing section comprising a basic information receiving section that receives basic information from terminal devices and an information extracting section that extracts pre-set specific information from the received basic information and generates an extracted information table that is stored in a server;
an authentication request instruction adding section that adds; to a print job, an authentication request instruction that expresses whether or not authentication is needed by a printing recipient at a time of printing;
a judging section that, on the basis of information included in the print job and the extracted information table stored in the server, judges whether or not the authentication request instruction is to be added by determining whether or not the specific information extracted by the information extracting section matches security judgment conditions;
when the judging section has judged that the authentication request instruction is to be added, the authentication request instruction adding section adds the authentication request instruction and the printing recipient information to the print job;
when the judging section has judged that the authentication request instruction is not to be added, the authentication request instruction adding section does not add the authentication request instruction and the printing recipient information to the print job;
a transmitting section that transmits the print job to a printer according to the instruction by a printing sender; and
a notification section that, when the authentication request instruction has been added to the print job transmitted by the transmitting section, notifies the printing recipient that the print job has been transmitted, and when the authentication request instruction has not been added to the print job transmitted by the transmitting section, does not notify the printing recipient that the print job has been transmitted;
wherein the authentication request instruction adding section adds the authentication request instruction to the print job before the print job is transmitted by the transmitting section, by setting the printing recipient and a password.

15. The print job information managing device of claim 14, wherein notification is sent only for special print jobs that are authentication-added print jobs and whose printing sender and printing recipient are different.

16. The print job information managing device of claim 14, wherein even if the printing sender and printing recipient are the same, notification is sent to a printing sender who is registered to receive notifications in advance.

17. A print job information managing device comprising:
a spool managing section comprising a basic information receiving section that receives basic information from terminal devices and an information extracting section that extracts pre-set specific information from the received basic information;
a judging section that judges whether or not the specific information extracted by the information extracting section matches security judgment conditions based on the information extracted by the information extracting section;
an authentication request instruction adding section that adds, to a print job, an authentication request instruction that expresses whether or not authentication is needed at a time of printing when it has been judged that information extracted by the information extracting section matches the security judgment condition by the judging section;

a transmitting section that transmits the print job to a printer; and a notification section that, when the authentication request instruction has been added to the print job transmitted by the transmitting section, notifies a printing recipient that the print job has been transmitted;

wherein the authentication request instruction adding section adds the authentication request instruction to the print job before the print job is transmitted by the transmitting section, by setting the printing recipient and a password;

the judging section judging whether or not the authentication request instruction is to be added on the basis of the extracted information and the security judgment conditions;

when the judging section has judged that the authentication request instruction is to be added, the authentication request instruction adding section adds the authentication request instruction to the print job; and the judging section judges whether or not the authentication request instruction is to be added, by judging, on the basis of an extracted information table generated by the information extracting section, whether or not the print job matches the security judgment conditions that are read-in from an authentication condition managing section.

* * * * *